(12) United States Patent
Miura

(10) Patent No.: US 8,886,121 B2
(45) Date of Patent: Nov. 11, 2014

(54) COMMUNICATION DEVICE, COMMNUNICATION METHOD, AND PROGRAM

(71) Applicant: Sony Corporation, Tokyo (JP)

(72) Inventor: Atsushi Miura, Kanagawa (JP)

(73) Assignee: Sony Corporation, Tokyo (JP)

( * ) Notice: Subject to any disclaimer, the term of this patent is extended or adjusted under 35 U.S.C. 154(b) by 155 days.

(21) Appl. No.: 13/705,996

(22) Filed: Dec. 5, 2012

(65) Prior Publication Data

US 2013/0093574 A1 Apr. 18, 2013

Related U.S. Application Data

(63) Continuation of application No. 11/847,198, filed on Aug. 29, 2007, now Pat. No. 8,351,857.

(30) Foreign Application Priority Data

Aug. 31, 2006 (JP) .................................. 2006-235802

(51) Int. Cl.
| | |
|---|---|
| *H04B 5/00* | (2006.01) |
| *G06K 7/10* | (2006.01) |
| *G06Q 20/32* | (2012.01) |
| *H04L 29/06* | (2006.01) |
| *G06Q 20/40* | (2012.01) |
| *G07F 7/10* | (2006.01) |
| *G07F 7/08* | (2006.01) |
| *G06Q 20/34* | (2012.01) |

(52) U.S. Cl.
CPC ........ *G06K 7/10237* (2013.01); *G06K 7/10297* (2013.01); *G06Q 20/327* (2013.01); *H04L 63/0869* (2013.01); *G06Q 20/40975* (2013.01); *G07F 7/1008* (2013.01); *H04L 63/0853* (2013.01); *H04L 63/0492* (2013.01); *G07F 7/0893* (2013.01); *G06Q 20/341* (2013.01)
USPC ...... 455/41.1; 455/41.2; 455/556.1; 455/410; 455/558

(58) Field of Classification Search
CPC .................................... H04B 5/00; H04B 5/02
USPC ..................... 455/41.1, 41.2, 556.1, 410, 558
See application file for complete search history.

(56) References Cited

U.S. PATENT DOCUMENTS 5,727,230 A * 3/1998 Fujioka .............................. 710/5
5,959,276 A * 9/1999 Iijima ........................... 235/380
(Continued)

FOREIGN PATENT DOCUMENTS

| JP | 2002-175552 | 6/2002 |
| JP | 2005-196693 | 7/2005 |
| JP | 2006-195795 | 7/2006 |

*Primary Examiner* — April G Gonzales
(74) *Attorney, Agent, or Firm* — K&L Gates LLP

(57) ABSTRACT

A communication device for managing a key necessary for secure near field communication includes an IC card function executing unit, a reader/writer function executing unit, a receiving unit, a determining unit, and a function execution controlling unit. The IC card function executing unit executes a function of an IC card. The reader/writer function executing unit executes a function of a reader/writer. The receiving unit receives a command. The determining unit determines whether the receiving command is intended for the IC card function or the reader/writer function. The function execution controlling unit controls the IC card function executing unit to execute the IC card function or the reader/writer function executing unit to execute the reader/writer function according to a result determined by the determining unit.

20 Claims, 7 Drawing Sheets

(56) References Cited

U.S. PATENT DOCUMENTS

| | | | | |
|---|---|---|---|---|
| 6,352,202 B2* | 3/2002 | Takiguchi et al. | | 235/451 |
| 7,240,345 B2* | 7/2007 | Sueyoshi et al. | | 717/161 |
| 7,363,448 B2* | 4/2008 | Morita | | 711/163 |
| 7,478,435 B2* | 1/2009 | Sueyoshi et al. | | 726/27 |
| 7,487,203 B2* | 2/2009 | Sueyoshi et al. | | 709/203 |
| 7,620,822 B2* | 11/2009 | Akashika et al. | | 713/190 |
| 7,634,295 B2* | 12/2009 | Hayaashi et al. | | 455/556.1 |
| 7,766,237 B2* | 8/2010 | Sakamoto et al. | | 235/451 |
| 2002/0069169 A1* | 6/2002 | Sukeda et al. | | 705/41 |
| 2003/0167398 A1* | 9/2003 | Sueyoshi et al. | | 713/189 |
| 2004/0230801 A1* | 11/2004 | Sueyoshi et al. | | 713/172 |
| 2004/0247118 A1* | 12/2004 | Tateno et al. | | 380/44 |
| 2005/0076212 A1* | 4/2005 | Mishina et al. | | 713/168 |
| 2005/0182926 A1* | 8/2005 | Akashika et al. | | 713/159 |
| 2006/0101136 A1* | 5/2006 | Akashika et al. | | 709/223 |
| 2006/0101512 A1* | 5/2006 | Yoshida et al. | | 726/20 |
| 2006/0198364 A1* | 9/2006 | Fujii | | 370/352 |
| 2006/0214006 A1* | 9/2006 | Mori et al. | | 235/492 |
| 2007/0026893 A1* | 2/2007 | Sakamoto et al. | | 455/558 |
| 2008/0005799 A1* | 1/2008 | Ogawa | | 726/26 |

\* cited by examiner

FIG. 6

| IDENTIFIER | PACKET LENGTH | COMMAND CODE | COMMAND DATA | CRC |
|---|---|---|---|---|
| 51 | 52 | 53 | 54 | 55 |

FIG. 7

| FUNCTION IDENTIFICATION INFORMATION | FUNCTION |
|---|---|
| 1234 | R/W |
| 4567 | IC CARD |
| ABCD | R/W |
| FF00 | IC CARD |
| FFFF | IC CARD |

COMMUNICATION DEVICE, COMMNUNICATION METHOD, AND PROGRAM

CROSS REFERENCES TO RELATED APPLICATIONS

This application claims priority to and the benefit as a continuation application of U.S. patent application Ser. No. 11/847,198, filed Aug. 29, 2007, which claims priority to Japanese Patent Application JP 2006-235802 filed in the Japanese Patent Office on Aug. 31, 2006, the entire contents of which are incorporated herein by reference.

BACKGROUND

The present application relates to communication devices, communication methods, and programs. In particular, the present application relates to a communication device, a communication method, and a program for enabling secure near field communication to be efficiently performed.

The use of an integrated circuit (IC) card system capable of performing near field communication, which is a type of radio communication, is rapidly spreading due to convenience thereof.

Such an IC card system is constituted by an IC card and a reader/writer. In the IC card system, the reader/writer generates a carrier wave, e.g., an electromagnetic wave (a radio frequency (RF) wave), whereby a so-called radio frequency (RF) field (a magnetic field) is formed. Close approach of the IC card to the reader/writer causes the power to be supplied to the IC card through electromagnetic induction, which enables data transmission to be performed between the IC card and the reader/writer.

IC card systems employ a tamper resistant device referred to as a secure application module (SAM) as a device for securely processing data that is acquired though this near field communication. By implementing a SAM in an IC card and a reader/writer, two-way secure near field communication can be performed.

A SAM implemented in an IC card or a reader/writer is generally designed to dedicate to one of a function of an IC card and a function of a reader/writer. More specifically, a SAM controls a data encryption operation in near field communication and manages keys utilized in the encryption operation. Since parameters referred to in the operation differ between the IC card function and the reader/writer function, for example, the SAM dedicated to the IC card function and the SAM dedicated to the reader/writer function are designed so that different parameters are set in each SAM.

Japanese Unexamined Patent Application Publication No. 2006-195792 discloses embodiments for implementing a SAM in a reader/writer and for carrying out secure processing in the reader/writer.

However, when SAMs are designed to dedicate to one of an IC card function and a reader/writer function as described above, the SAM dedicated to the IC card function cannot be utilized as the SAM dedicated to the reader/writer function. The same applies to the opposite case.

In addition, for example, in a case where a SAM has a subscriber identity module (SIM)-like shape and can be removably utilized, it is necessary for users to switch between a SAM dedicated to an IC card function and a SAM dedicated to a reader/writer function depending on the desired function, which is troublesome.

SUMMARY

Embodiments of the present application are provided in view of such circumstances, and enable a single SAM to execute both the IC card function and the reader/writer function.

According to an embodiment, a communication device for managing a key necessary for secure near field communication includes IC card function executing means for executing a function of an IC card, reader/writer function executing means for executing a function of a reader/writer, receiving means for receiving a command, determining means for determining whether the received command is intended for the IC card function or the reader/writer function, and function execution controlling means for controlling the IC card function executing means to execute the IC card function or the reader/writer function executing means to execute the reader/writer function according to a result determined by the determining means.

The communication device may further include storage means for storing information necessary for executing the IC card function and information necessary for executing the reader/writer function. The reader/writer function executing means may execute the reader/writer function utilizing the information necessary for executing the IC card function as well as the information necessary for executing the reader/writer function.

A communication method according to another embodiment includes the steps of executing a function of an IC card, executing a function of a reader/writer, receiving a command, determining whether the received command is intended for the IC card function or the reader/writer function, and executing the IC card function through the processing performed at the step of executing the IC card function or the reader/writer function through the processing performed at the step of executing the reader/writer function according to a result obtained in the processing performed at the step of determining.

A program according to still another embodiment causes a computer to execute a communication method including the steps of executing a function of an IC card, executing a function of a reader/writer, receiving a command, determining whether the received command is intended for the IC card function or the reader/writer function, and executing the IC card function through the processing performed at the step of executing the IC card function or the reader/writer function through the processing performed at the step of executing the reader/writer function according to a result obtained in the processing performed at the step of determining.

In the communication device, the communication method, and the program according to an embodiment, a command is received. It is determined whether the received command is a command intended for the IC card function or a command intended for the reader/writer function. According to the determination result, the IC card function or the reader/writer function is executed.

A single SAM to execute both the IC card function and the reader/writer function, for example, in an embodiment.

Additional features and advantages are described herein, and will be apparent from, the following Detailed Description and the figures.

BRIEF DESCRIPTION OF THE FIGURES

FIG. 6 is a diagram illustrating an example of a structure of a command packet;

FIG. 7 is a diagram illustrating function identification information;

DETAILED DESCRIPTION

Figure 3:
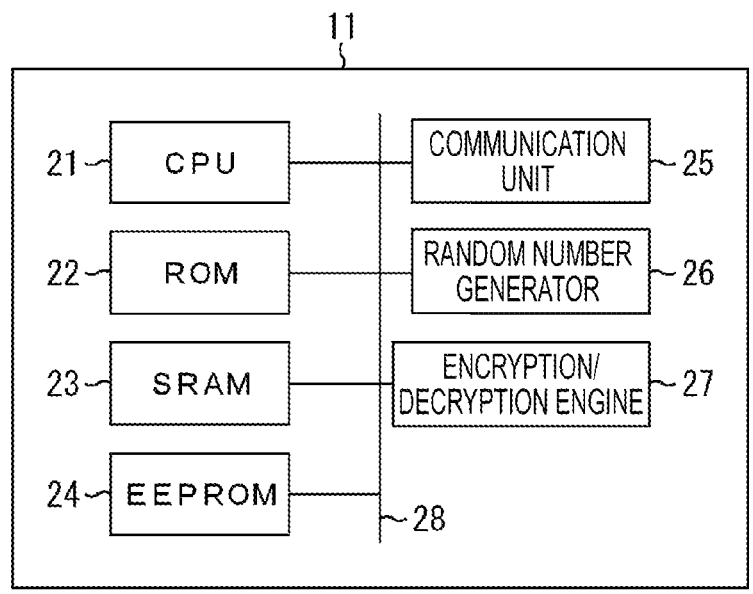
FIG. 3 is a block diagram illustrating an example of a configuration of a SAM 11 shown in FIG. 1 or FIG. 2.

According to an embodiment, a communication device for managing a key necessary for secure near field communication includes IC card function executing means (for example, a central processing unit (CPU) 21 shown in FIG. 3) for executing a function of an IC card, reader/writer function executing means (for example, the CPU 21 shown in FIG. 3) for executing a function of a reader/writer, receiving means (for example, a communication unit 25 shown in FIG. 3) for receiving a command, determining means (for example, the CPU 21 shown in FIG. 3) for determining whether the received command is intended for the IC card function or the reader/writer function, and function execution controlling means (for example, the CPU 21 shown in FIG. 3) for controlling the IC card function executing means to execute the IC card function or the reader/writer function executing means to execute the reader/writer function according to a result determined by the determining means.

The communication device may further include storage means (for example, an electronically erasable and programmable read only memory (EEPROM) 24 shown in FIG. 3) for storing information necessary for executing the IC card function and information necessary for executing the reader/writer function. The reader/writer function executing means may execute the reader/writer function utilizing the information necessary for executing the IC card function as well as the information necessary for executing the reader/writer function.

Figure 5:
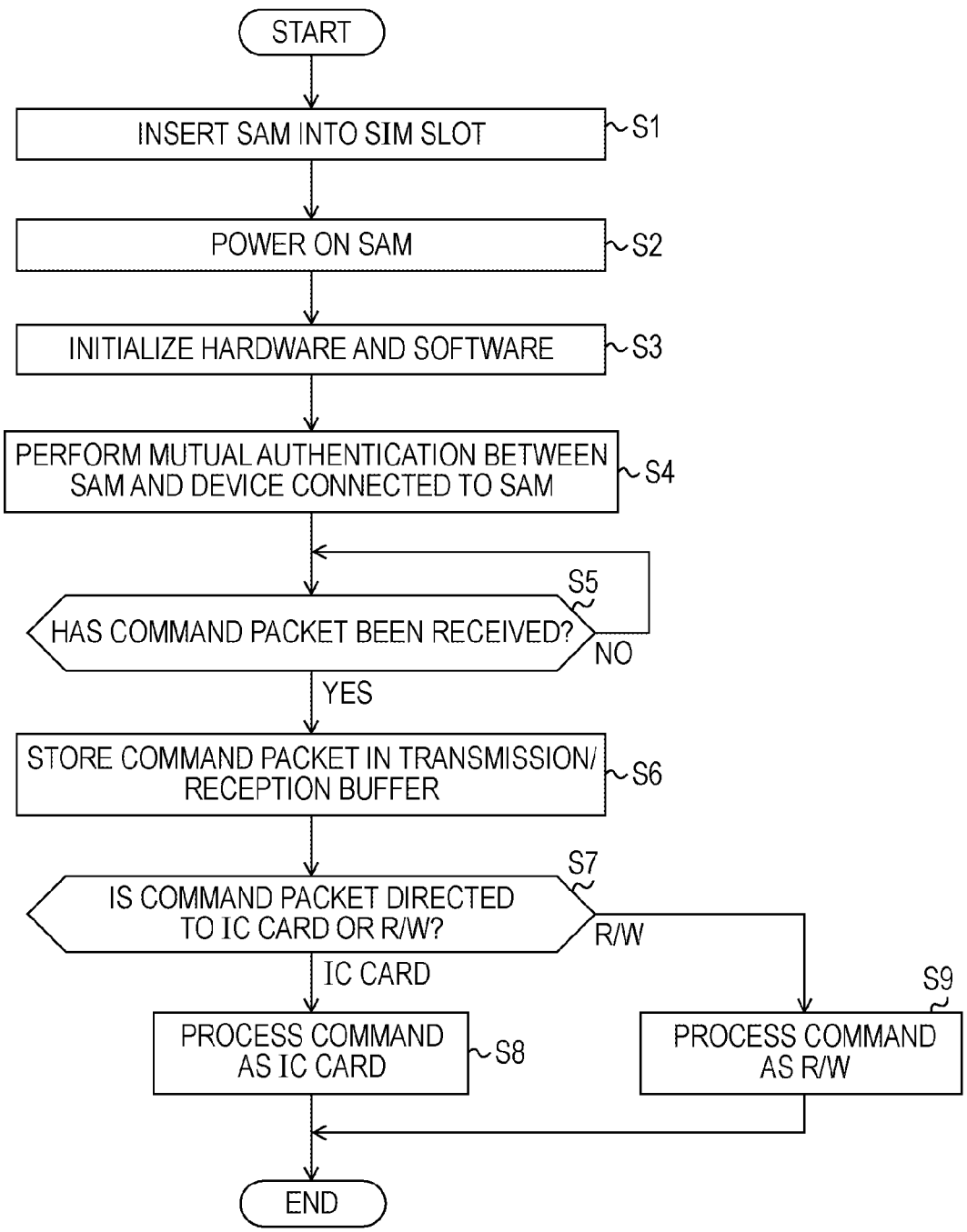
FIG. 5 is a flowchart illustrating an operation of a SAM 11.

A communication method according to another embodiment for a communication device that manages a key necessary for secure near field communication or a program according to still another embodiment for causing a computer to execute a communication method for managing a key necessary for secure near field communication includes the steps of executing a function of an IC card (for example, STEP S8 shown in FIG. 5), executing a function of a reader/writer (for example, STEP S9 shown in FIG. 5), receiving a command (for example, STEP S5 shown in FIG. 5), determining whether the received command is intended for the IC card function or the reader/writer function (for example, STEP S7 shown in FIG. 5), and executing the IC card function through the processing performed at the step of executing the IC card function or the reader/writer function through the processing performed at the step of executing the reader/writer function according to a result obtained in the processing performed at the step of determining (for example, STEP S7 to STEP S9 shown in FIG. 5).

Figure 1:
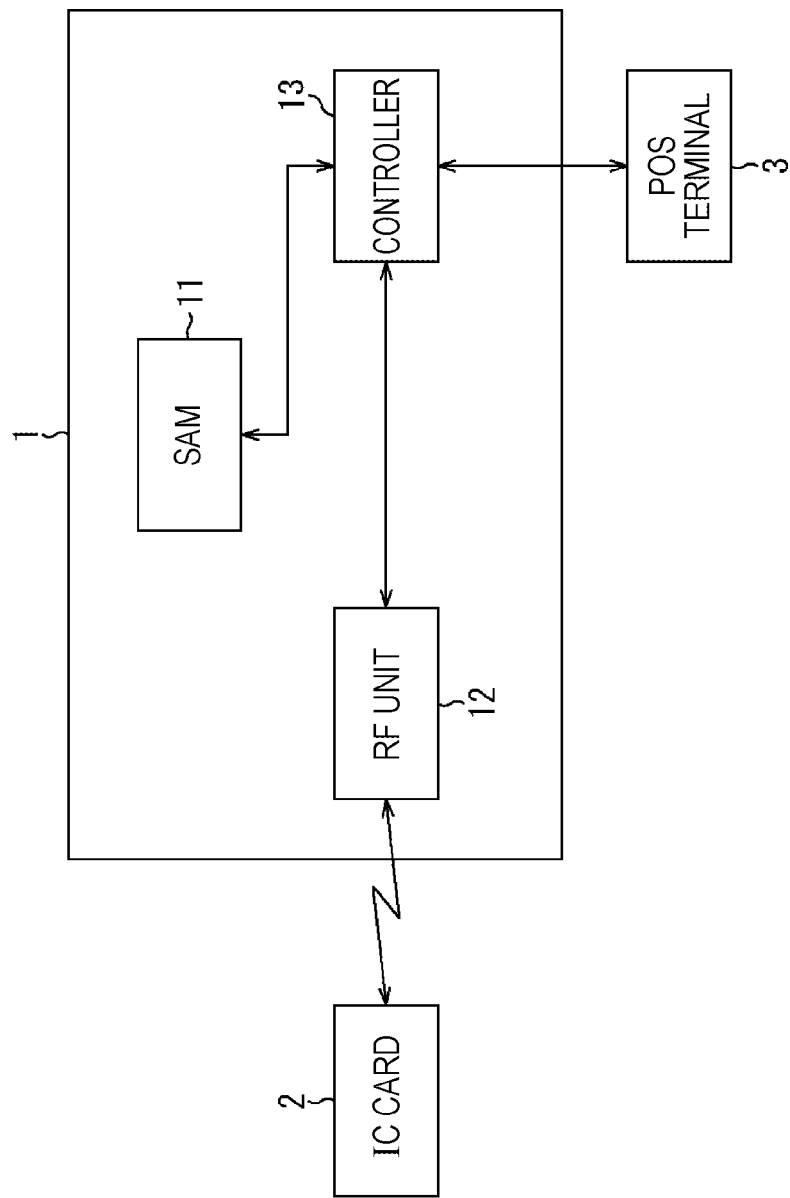
FIG. 1 is a block diagram illustrating a utilization example of a communication device 1 that employs an embodiment.
Figure 2:
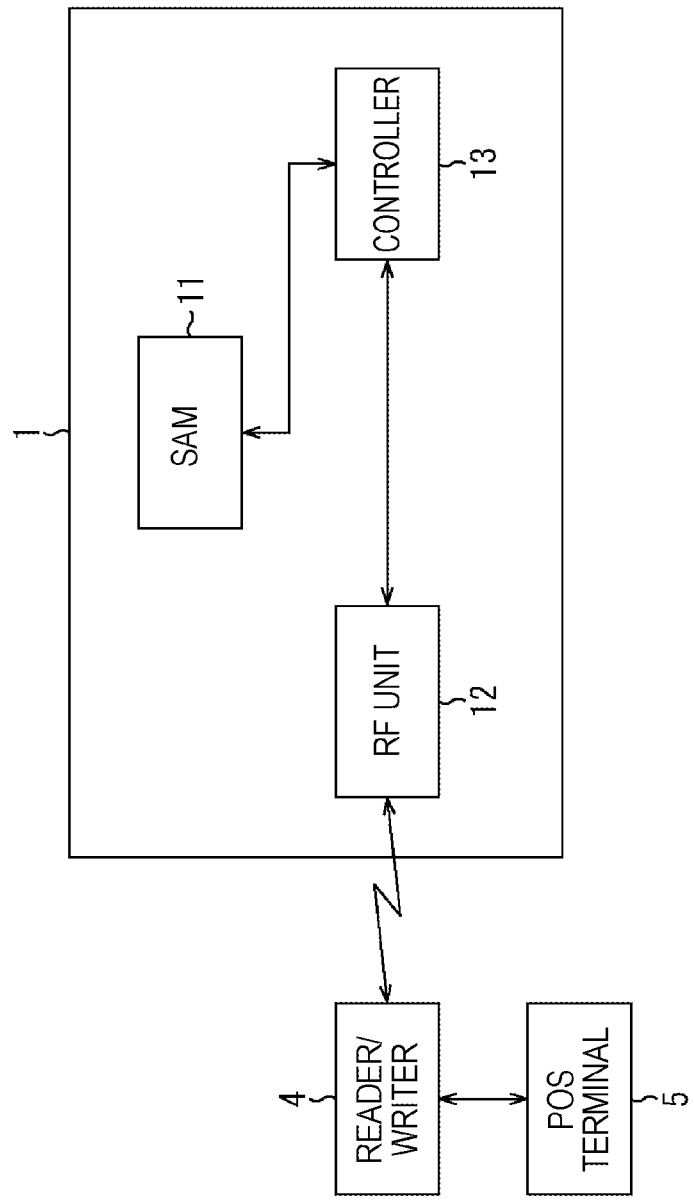
FIG. 2 is a block diagram illustrating another utilization example of a communication device 1 that employs an embodiment.

FIGS. 1 and 2 illustrate utilization examples and configuration examples of a communication device 1 that employs an embodiment.

The communication device 1 has both functions of an IC card and functions of a reader/writer, and appropriately executes one of the functions depending on utilization of the communication device 1. More specifically, the communication device 1 is capable of performing secure near field communication with an IC card 2 while serving as a reader/writer as shown in FIG. 1. The communication device 1 is also capable of performing secure near field communication with a reader/writer 4 while serving as an IC card as shown in FIG. 2.

A point of sales system (POS) terminal 3 shown in FIG. 1 and a POS terminal 5 shown in FIG. 2 are connected to the communication device 1 that is serving as a reader/writer and a reader writer 4, respectively. The POS terminals 3 and 5 control the communication device 1 that is serving as a reader/writer and the reader/writer 4 to execute near field communication with the IC card 2 and the communication device 1 that is serving as an IC card, respectively.

For example, a command supplied from the POS terminal 3 shown in FIG. 1 is encrypted in the communication device 1, and then sent to the IC card 2. Data corresponding to a command sent from the IC card 2 is decrypted in the communication device 1, and then supplied to the POS terminal 3.

The communication device 1 may be a portable device, such as a mobile phone, or may be a fixed device that is combined with a POS terminal.

The communication device 1 includes a SAM (secure application module) 11, an RF (radio frequency) unit 12, and a controller 13.

The SAM 11 has, for example, a SIM (subscriber identity module)-like shape, and removably inserted into the communication device 1. The SAM 11 securely processes data that is acquired via near field communication performed in the communication device 1 while serving as an IC card or a reader/writer.

The RF unit 12 allows near field communication to be performed with a communication partner utilizing a carrier wave.

The controller 13 controls the SAM 11 and the RF unit 12 to execute processing for realizing the IC card function or the reader/writer function.

The communication device 1 may further include a control unit (not shown) for controlling communication with the POS terminal 3 in a case where the communication device 1 executes functions of a reader/writer as shown in FIG. 1, if necessary.

FIG. 3 illustrates an example of a configuration of the SAM 11.

The SAM 11 includes a central processing unit (CPU) 21, a read only memory (ROM) 22, a static random access memory (SRAM) 23, an electronically erasable and programmable read only memory (EEPROM) 24, a communication unit 25, a random number generator 26, and an encryption/decryption engine 27, which are connected to each other through a bus 28.

The CPU 21 loads, to the SRAM 23, programs stored in the ROM 22 or programs installed in the EEPROM 24 from the outside, and executes the programs.

Figure 4:
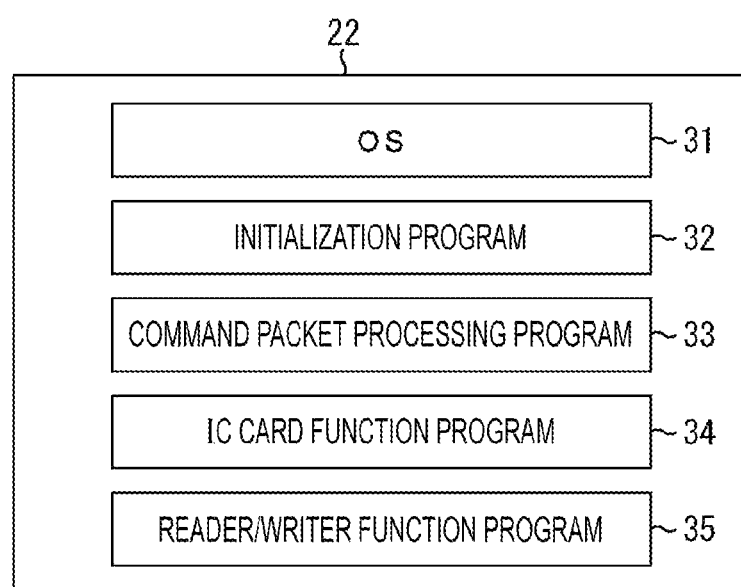
FIG. 4 is a diagram illustrating an example of programs stored in a ROM 22 shown in FIG. 3.

As shown in FIG. 4, the ROM 22 stores an operating system (OS) 31, an initialization program 32, a command packet processing program 33, an IC card function program 34, and a reader/writer function program 35. The OS 31 executes basic processing of the SAM 11. The initialization program 32 loads data stored in the EEPROM 24 into the SRAM 23. The command packet processing program 33 analyzes received communication packet data (hereinafter, referred to as a command packet) to determine whether the command is intended for the IC card function or the reader writer function. The IC card function program 34 executes processing of the IC card function. The reader/writer function program 35 executes processing of the reader/writer function.

Referring back to FIG. 3, the SRAM 23 is a volatile memory that is used as a work area or a program stack when executing programs stored in the ROM 22 or the EEPROM 24, a reception/transmission buffer, and special registers.

The EEPROM 24 serves as a non-volatile user memory area, and stores data used in the IC card function and the reader/writer function. The EEPROM 24 also stores programs sent from external devices. A ferroelectric random access memory (FERAM) may be used instead of the EEPROM.

The communication unit 25 sends and receives data to and from the controller 13, which is connected to the SAM 11. The SAM 11 may be connected to external devices in a contact or contactless manner.

The random number generator 26 generates random numbers to be used by the encryption/decryption engine 27.

The encryption/decryption engine 27 is used for encryption and decryption of a communication path between an IC card and a reader/writer, for generation of access keys used when accessing data, for encryption and decryption of user data, and for mutual authentication.

An operation of the SAM 11 of the communication device 1 will be described next with reference to a flowchart illustrated in FIG. 5.

After the insertion of the SAM 11 into a slot (not shown) of the communication device 1 at STEP S1, the SAM 11 is powered on at a timing given by the controller 13 at STEP S2. The initialization program 32 is activated to perform initialization of hardware and software at STEP S3.

After the completion of the initialization of the hardware and the software, the OS 31 is activated to perform mutual authentication between the SAM 11 and the controller 13 at STEP S4. After the mutual authentication is performed between the SAM 11 and the controller 13 in such a manner, the SAM 11 is ready to operate in the communication device 1 and is ready to exchange data with the controller 13.

As a method for the mutual authentication, a symmetric key cryptography defined by, for example, ISO/IEC 9798-2 can be used. However, the method is not limited to this particular example. At the same time as such mutual authentication, a temporary session key is shared between the SAM 11 and a device connected thereto, and communication data, which is encrypted using this session key, is exchanged between the SAM 11 and the device connected thereto. If different session keys are used in each session, the same shared key may be used at the time of mutual authentication in each device. However, security increases when different shared keys are used.

After the completion of the mutual authentication, the OS 31 waits until a command packet is received at STEP S5. Upon receiving the command packet at STEP S5, the OS 31 stores the received command packet in a transmission/reception buffer provided in the SRAM 23 of the SAM 11 at STEP S6. The OS 31 also activates the command packet processing program 33.

The command packet processing program 33 determines whether the received command packet is intended for the IC card function or the reader/writer function next at STEP S7.

As shown in FIG. 6, a command packet is a data sequence starting with an identifier 51. A command packet contains the identifier 51, which includes function identification information for indicating whether the command packet is intended for the IC card function or the reader/writer function.

Additionally, as shown in FIG. 7, the EEPROM 24 stores a table indicating functions that correspond to function identification information.

More specifically, the command packet processing program 33 refers to the table shown in FIG. 7, and determines whether the received command packet is intended for the IC card function or the reader/writer function on the basis of the function identification information of the identifier 51 of the received command packet.

A packet length 52 of the command packet shown in FIG. 6 indicates a length of a data sequence from the packet length 52 to command data 54 of the command packet.

A command code 53 indicates a processing content based on a protocol specification of the system. The command data 54 is used in the processing corresponding to the command code 53.

A cyclic redundancy check (CRC) 55 is used for verifying the consistency of the data sequence from the packet length 52 to the command data 54 of the command packet. For example, the CRC 55 may be a result of a CRC-CCITT calculation. The CRC 55 is re-calculated if the command packet is modified in a device that the packet goes through.

Referring back to FIG. 5, if the received command packet is determined to be intended for the IC card function at STEP S7, the command packet processing program 33 activates the IC card function program 34 at STEP S8. At the same time, the command packet processing program 33 supplies the received command packet to the IC card function program 34.

The IC card function program 34 executes processing of an IC card function specified by the command code 53 of the supplied command packet using the command data 54.

On the other hand, if the received command packet is determined to be intended for the reader/writer function at STEP S7, the process proceeds to STEP S9. At STEP S9, the command packet processing program 33 activates the reader/writer function program 35, and supplies the received command packet to the reader/writer function program 35.

The reader/writer function program 35 executes processing of a reader/writer function specified by the command code 53 of the supplied command packet using the command data 54.

Thereafter, the operation is terminated.

In the above, the reader/writer function and the IC card function of the communication device 1 have been separately described with reference to FIGS. 1 and 2. However, the reader/writer function and the IC card function may be switched to one another during the series of processing.

For example, if information regarding another IC card (not shown) is needed in processing performed between the communication device 1 serving as an IC card and the reader/writer 4 as shown in the example of FIG. 2, the communication device 1 functions as a reader/writer, and acquires necessary information from the other IC card. The communication device 1 then functions as an IC card, and executes the processing performed between the communication device 1 and the reader/writer 4.

More specifically, when the communication device 1 serving as an IC card is put over the reader/writer 4, the communication device 1 executes processing of the IC card. For example, if a message saying "Please put another IC card over the reader/writer" is displayed on a display unit (not shown) of the communication device 1 in the course of the processing and a user performs a predetermined operation (e.g., a user operates a predetermined button (not shown) of the communication device 1), the reader/writer function is activated in the communication device 1 that has been operating as an IC card. The communication device 1 then serves as a reader/writer and waits for the communication with the IC card.

If the other IC card is put over the communication device 1 serving as a reader/writer, the communication device 1 reads necessary information from the other IC card using the reader/writer function. Then, the IC card function is activated again, and the communication device 1 returns, as an IC card, a response based on the information acquired from the other IC card to the reader/writer 4.

As described above, the SAM 11 of the communication device 1 has both functions of an IC card and functions of a reader/writer, and executes one of the functions depending on the received command. Thus, secure near field communication can be performed in the communication device 1, for example, without switching the SAM 11 depending on the function to be utilized.

Meanwhile, when the communication device 1 executes reader/writer functions (FIG. 1), the communication device 1 generally sends a command packet, which is encrypted using an access key shared with the IC card 2, to the IC card 2 first. In the related art, this access key is supplied from the POS terminal 3.

In an embodiment, the communication device 1 shown in FIG. 1 also has the IC card function, and thus has information (including an access key) used when serving as the IC card 2. Therefore, the communication device 1 can encrypt the command packet utilizing the information.

For example, the communication device 1 shown in FIG. 1 communicates with the IC card 2, and acquires, from the IC card 2, ID information of the IC card 2. The communication device 1 then determines whether or not the communication device 1 holds IC card information corresponding to the ID. Upon determining that the communication device 1 has the IC card information, the communication device 1 sends the command packet to the IC card 2 after encrypting the packet using the access key.

As described above, the access key has been calculated in the POS terminal 3, which means a service provider that manages the POS terminal 3 knows security information (an algorithm and keys used for accessing). Parties other than manufactures of the communication device 1 serving as a reader/writer use, for example, Internet protocol (IP) resources, due to which a security problem may be caused.

For this problem, configurations of the embodiments allow information regarding security between both parties and processing that uses the information to be performed in a closed environment of a secure access module. Accordingly, the IP resources regarding security do not have to be disclosed to the outside, and thus the IC card system can be utilized in more secure manner.

Herein, the IC card information is acquired from the IC card 2 and the access key necessary for the communication with the IC card 2 is decided based on the information. However, the communication device 1 may acquire information indicating the access key necessary for the communication with the current communication target IC card 2 and information indicating a version of the access key from, for example, the POS terminal 3, and may perform the communication with the IC card 2 using the access key corresponding to the information.

Accordingly, in this case, when processing performed in the communication device 1 (i.e., an application executed in the communication device 1) utilizes the information supplied from, for example, a plurality of service providers (POS terminals or the like), one service provider cannot know access keys of other service providers. Thus, a risk of key information leakage can be reduced.

Figure 8:
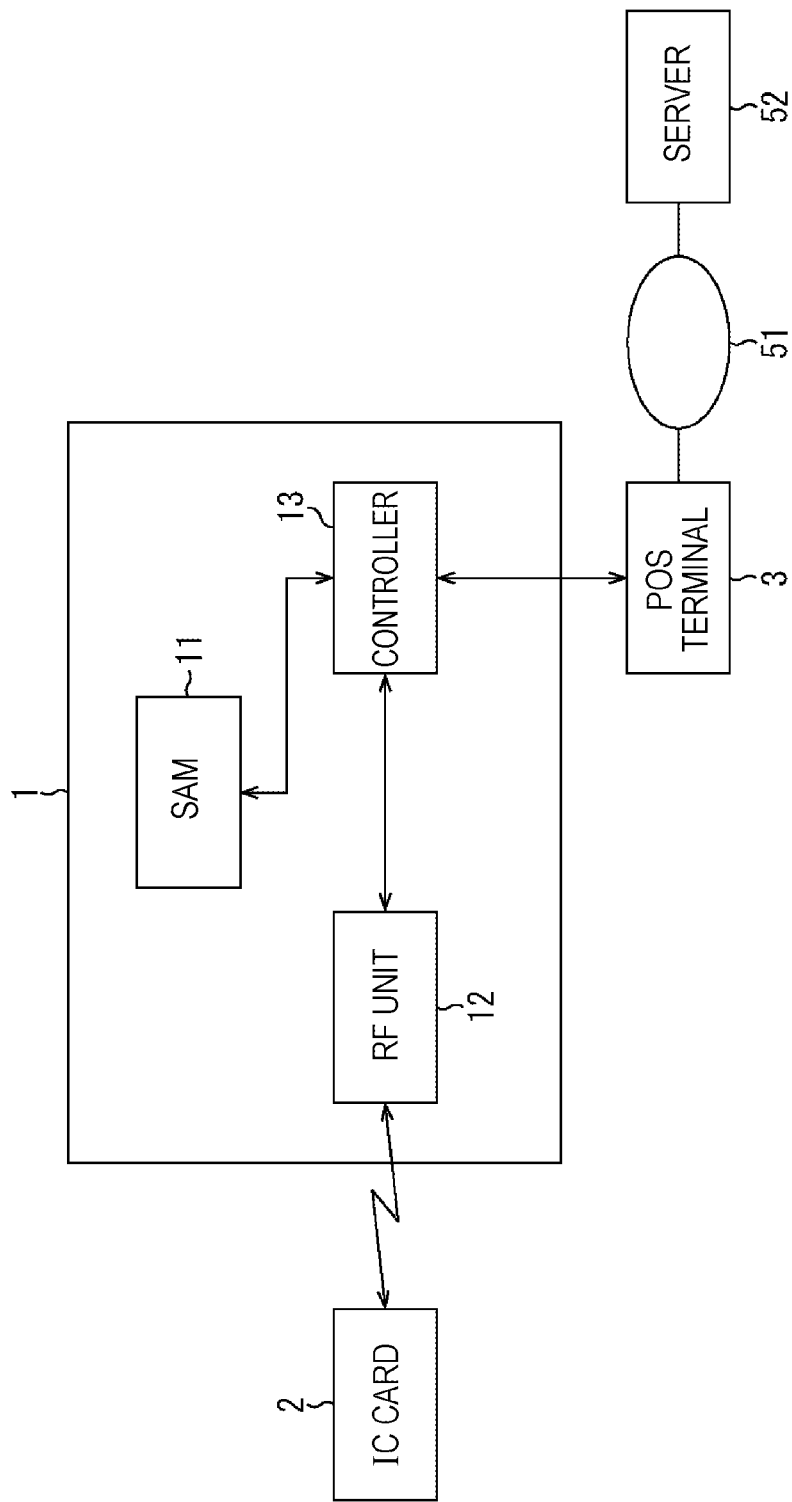
FIG. 8 is a block diagram illustrating still another utilization example of a communication device 1 that employs an embodiment.

In addition, in the configuration of the SAM 11 shown in FIG. 3, the EEPROM 24 stores programs sent from external devices and the CPU 21 executes the programs. FIG. 8 illustrates a specific example of downloading the programs.

A POS terminal 3 is connected to a network 51, such as a local area network (LAN) or the Internet. A server 52 for storing programs to be downloaded to the communication device 1 is connected to the network 51.

More specifically, the communication device 1 communicates with the server 52 through the POS terminal 3 and the network 51 to download necessary programs, and stores the downloaded programs in an EEPROM 24.

Figure 9:
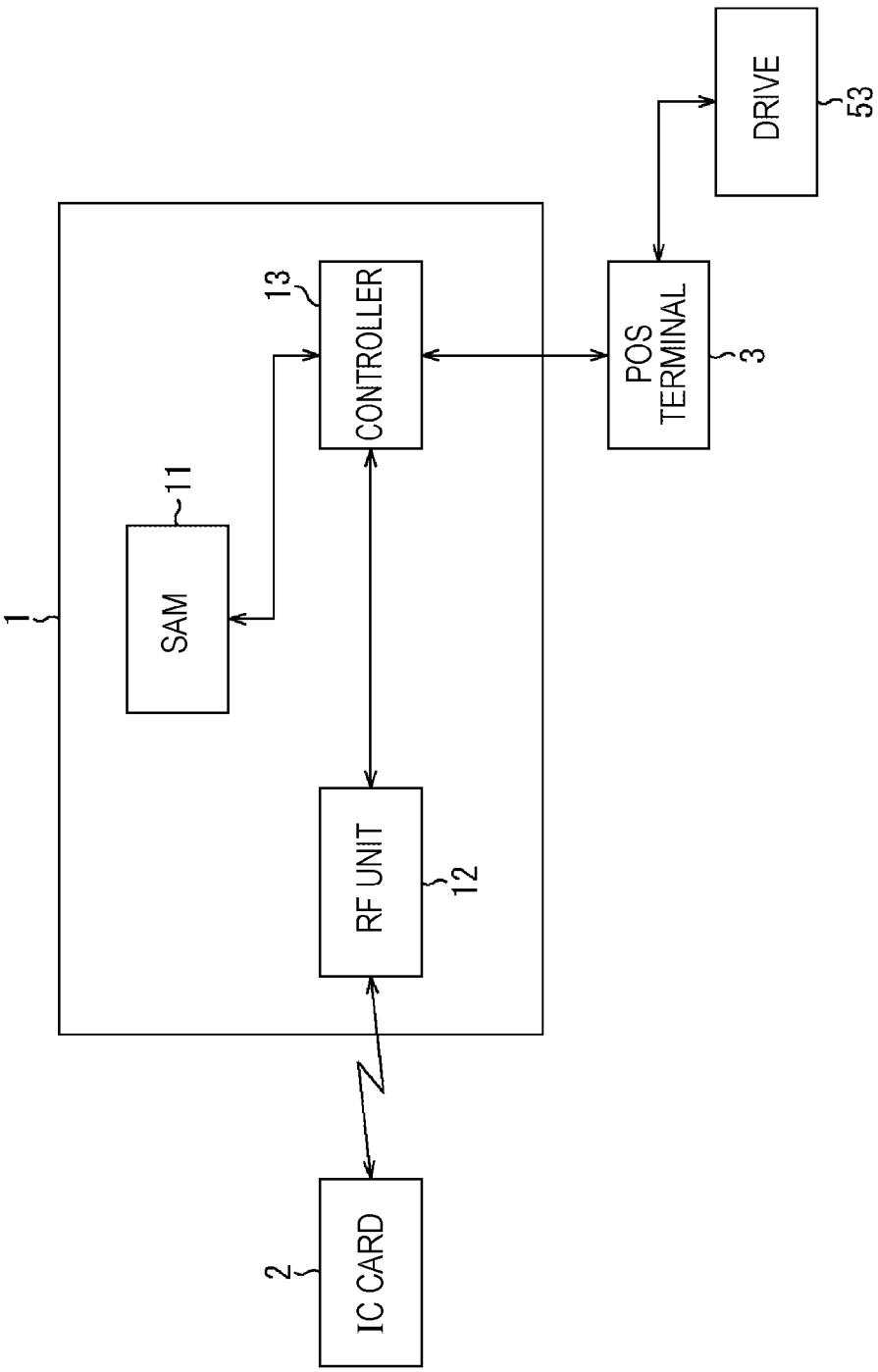
FIG. 9 is a block diagram illustrating a still further utilization example of a communication device 1 that employs an embodiment.

FIG. 9 illustrates another specific example of downloading the programs.

A media drive 53 is connected to a POS terminal 3 through a universal serial bus (USB) or the like. Programs may be read out from a removable recording medium, such as a flexible disc, a compact disc read only memory (CD-ROM), a magneto-optical (MO) disc, a digital versatile disc (DVD), a magnetic disc, or a semiconductor memory, that is inserted into the drive 53, and may be installed in an EEPROM 24.

As described above, programs can be downloaded. Accordingly, for example, a part of stored programs can be downloaded, whereby functions can be easily switched.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A communication device capable of performing an IC function and a reader/writer function for near field communication, the communication device comprising:
   a tamper resistant unit configured to store predetermined information to perform the IC card function and the reader/writer function;
   a receiver;
   at least one processor; and
   at least one memory device storing instructions which when executed by the at least one processor cause the at least one processor to operate with the tamper resistant unit and the receiver to:
   (a) receive information in the receiver from a wirelessly coupled device;
   (b) determine whether at least one of the IC card function or the reader/writer function is to be performed based on the received information;
   (c) responsive to determining the IC card function is to be performed, use the predetermined information in the tamper resistant unit to perform the IC card function; and
   (d) responsive to determining the reader/writer function is to be performed, use the predetermined information in the tamper resistant unit to perform the reader/writer function.

2. The communication device of claim 1, wherein the receiver is a communication unit configured to perform near field communication.

3. The communication device of claim 1, wherein the received information includes a command packet.

4. The communication device of claim 3, wherein when executed by the processor, the instructions cause the processor to:
(a) determine function identification information included within an identifier header of the command packet;
(b) determine a function indicator that matches the function identification information;
(c) process the command packet using the IC card function if the matching function indicator corresponds to the IC card function; and
(d) process the command packet using the reader/writer function if the matching function indicator corresponds to the reader/writer function.

5. The communication device of claim 1, wherein the predetermined information includes identification information of a subscriber ID associated with the tamper resistant unit.

6. The communication device of claim 1, wherein the wirelessly coupled device includes at least one of an IC card or a reader/writer.

7. The communication device of claim 1, wherein the tamper resistant unit includes a SIM card.

8. A communication device capable of performing an IC function and a reader/writer function for near field communication, the communication device comprising:
an interface configured to communicatively couple with a tamper resistant unit that is configured to store predetermined information to perform the IC card function and the reader/writer function;
a receiver;
at least one processor; and
at least one memory device storing instructions which when executed by the at least one processor cause the at least one processor to operate with the interface and the receiver to:
(a) receive information in the receiver from a wirelessly coupled device;
(b) determine whether at least one of the IC card function or the reader/writer function is to be performed based on the received information;
(c) request, via the interface, the predetermined information from the tamper resistant unit that corresponds to the function that is to be performed;
(d) responsive to determining the IC card function is to be performed, use the predetermined information to perform the IC card function; and
(e) responsive to determining the reader/writer function is to be performed, use the predetermined information to perform the reader/writer function.

9. The communication device of claim 8, wherein the tamper resistant unit is separate from the communication device and communicates wirelessly with the interface.

10. The communication device of claim 8, wherein the tamper resistant unit is included within the wirelessly coupled device.

11. The communication device of claim 8, wherein the tamper resistant unit is configured to be connected to the interface.

12. The communication device of claim 8, wherein when executed by the processor, the instructions cause the processor to:
(a) determine function identification information included within the received information;
(b) determine a function indicator that matches the function identification information;
(c) process the received information using the IC card function if the matching function indicator corresponds to the IC card function; and
(d) process the received information using the reader/writer function if the matching function indicator corresponds to the reader/writer function.

13. The communication device of claim 12 wherein when executed by the processor, the instructions cause the processor to:
(a) identify a command code included within the received information;
(b) process the IC card function based on the command code if the matching function indicator corresponds to the IC card function; and
(c) process the reader/writer function based on the command code if the matching function indicator corresponds to the reader/writer function.

14. The communication device of claim 12 wherein when executed by the processor, the instructions cause the processor to:
(a) deactivate the reader/writer function when the IC card function is to be performed; and
(b) deactivate the IC card function when the reader/writer function is to be performed.

15. A method of operating a communication device capable of performing an IC function and a reader/writer function for near field communication, the method comprising:
(a) receiving information in a receiver from a wirelessly coupled device;
(b) determining whether at least one of the IC card function or the reader/writer function is to be performed based on the received information;
(c) requesting predetermined information from a tamper resistant unit based on which function is to be performed, the predetermined information including information to perform the IC card function and information to perform the reader/writer function;
(d) responsive to determining the IC card function is to be performed, performing the IC card function using the predetermined information associated with the IC card function; and
(e) responsive to determining the reader/writer function is to be performed, performing the reader/writer function using the predetermined information associated with the reader/writer function.

16. The method of claim 15, wherein the received information is received after bringing the communication device into proximity with the wirelessly coupled device to enable the received information to be transmitted using near field communication.

17. The method of claim 15, wherein the received information includes a command packet.

18. The method of claim 17, further comprising:
(a) identifying function identification information included within an identifier header of the command packet;
(b) accessing a function table and determining a function indicator that corresponds to the function identification information;
(c) processing the command packet using the IC card function if the matching function indicator corresponds to the IC card function; and
(d) processing the command packet using the reader/writer function if the matching function indicator corresponds to the reader/writer function.

19. The method of claim 15, further comprising performing encryption of information to be transmitted during at least one of the IC card function and the reader/writer function.

20. The method of claim 15, further comprising generating an access key to access data from the wirelessly coupled device during at least one of the IC card function and the reader/writer function.

\* \* \* \* \*